United States Patent
Huang

(10) Patent No.: US 10,012,845 B1
(45) Date of Patent: Jul. 3, 2018

(54) GLASSES FRAME STRUCTURE

(71) Applicant: GEM OPTICAL CO., LTD., Taichung (TW)

(72) Inventor: Yen-Hung Huang, Taichung (TW)

(73) Assignee: GEM OPTICAL CO., LTD., Taichung (TW)

( * ) Notice: Subject to any disclaimer, the term of this patent is extended or adjusted under 35 U.S.C. 154(b) by 0 days.

(21) Appl. No.: 15/364,412

(22) Filed: Nov. 30, 2016

(51) Int. Cl.
| | |
|---|---|
| *G02C 1/00* | (2006.01) |
| *G02C 1/04* | (2006.01) |
| *G02C 5/00* | (2006.01) |
| *G02C 5/06* | (2006.01) |

(52) U.S. Cl.
CPC .............. *G02C 1/04* (2013.01); *G02C 5/008* (2013.01); *G02C 5/06* (2013.01); *G02C 2200/16* (2013.01)

(58) Field of Classification Search
CPC .................................... G02C 1/10; G02C 1/00
USPC ........................ 351/86, 83, 85, 110, 103, 106
See application file for complete search history.

(56) References Cited

U.S. PATENT DOCUMENTS 6,959,988 B1 * 11/2005 Sheldon .................. G02C 1/04
351/103

* cited by examiner

*Primary Examiner* — Hung Dang

(57) ABSTRACT

A glasses frame structure 1 contains: a body (10), a lens assembly (20), and a fixing element (30). The body (10) includes a fixer (11) made of elastic plastic material, two extensions (14), a connection protrusion (15), a limiting groove (151), and a positioning orifice (16). The fixer (11) has two first retaining units (12), and each of the two first retaining units (12) has a fastening space (121), wherein the fastening space (121) has a first tilted face (122) and a first engagement tab (123). The lens assembly (20) includes a top fringe (21), an affix projection (23) corresponding to the positioning orifice (16) so that the top fringe (21) retains with the limiting groove (16), and the affix projection (23) engages with the positioning orifice (16). The top fringe (21) has two second retaining units (22) corresponding to the two first retaining units individually, wherein said each second retaining unit (22) has a second tilted face (226) and a second engagement tab (221).

5 Claims, 8 Drawing Sheets

X-X x-x y-y

GLASSES FRAME STRUCTURE

BACKGROUND

The present invention relates to a glasses frame structure which is assembled quickly and has low assembly cost.

BRIEF SUMMARY OF THE INVENTION

As shown in FIGS. 1 and 2, a conventional glasses A contains: a glasses frame A1, a lens assembly A2, and a connector A17, wherein the glasses frame A1 has a fixer A11 and two extensions A16 extending outwardly from two ends of the fixer A11 respectively, a connection zone A12 defined on a top of the fixer A11, a first stop shoulder A14 and a second stop shoulder A15 which both abut against the lens assembly A2, and multiple coupling orifices 13 arranged in the connection zone A12.

The lens assembly A2 includes a locking protrusion A21 formed on a front end of a central portion thereof, and the connector A17 has a fixing trench A18 correspond to and retaining with the locking protrusion A21. The lens assembly A2 also includes multiple columns A19 corresponding to and retaining with the multiple coupling orifices 13 of the fixer A11 individually, such that the lens assembly A2 is mounted between the glasses frame A1 and the connector A17. However, the glasses frame A1 is complicated and has high assembly cost.

The primary objective of the present invention is to provide a glasses frame structure in which the fastening space of each first retaining unit expends horizontally by way of the fixer made of elastic plastic material so as to enhance the locking margin of the fastening space and the second engagement tab of the lens assembly.

Another objective of the present invention is to provide a glasses frame structure which is assembled quickly and has low assembly cost.

DETAILED DESCRIPTION OF INVENTION

Figure 1:
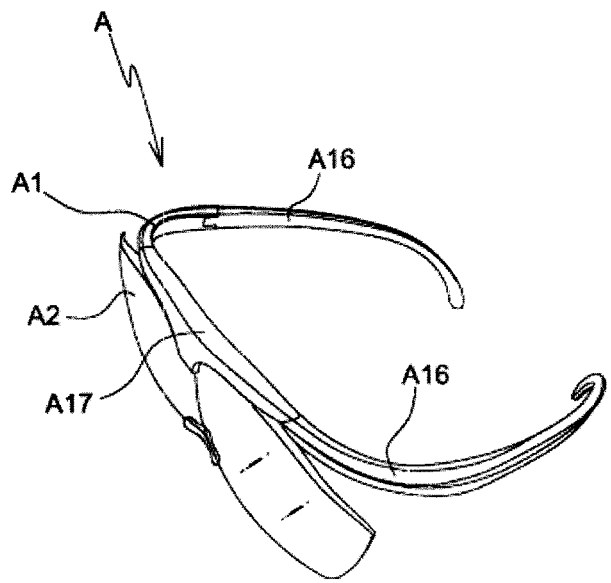
FIG. 1 is a perspective view showing the assembly of conventional glasses.
Figure 2:
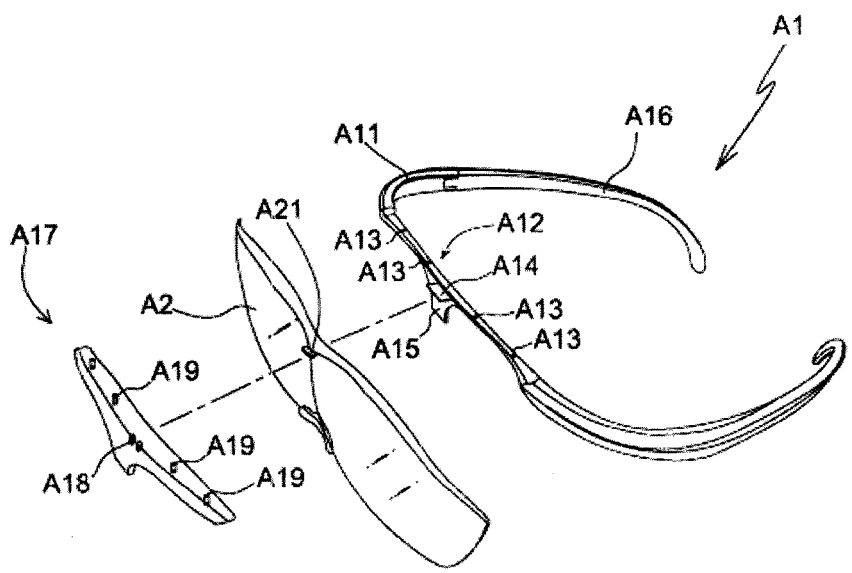
FIG. 2 is a perspective view showing the exploded components of the conventional glasses.
Figure 3:
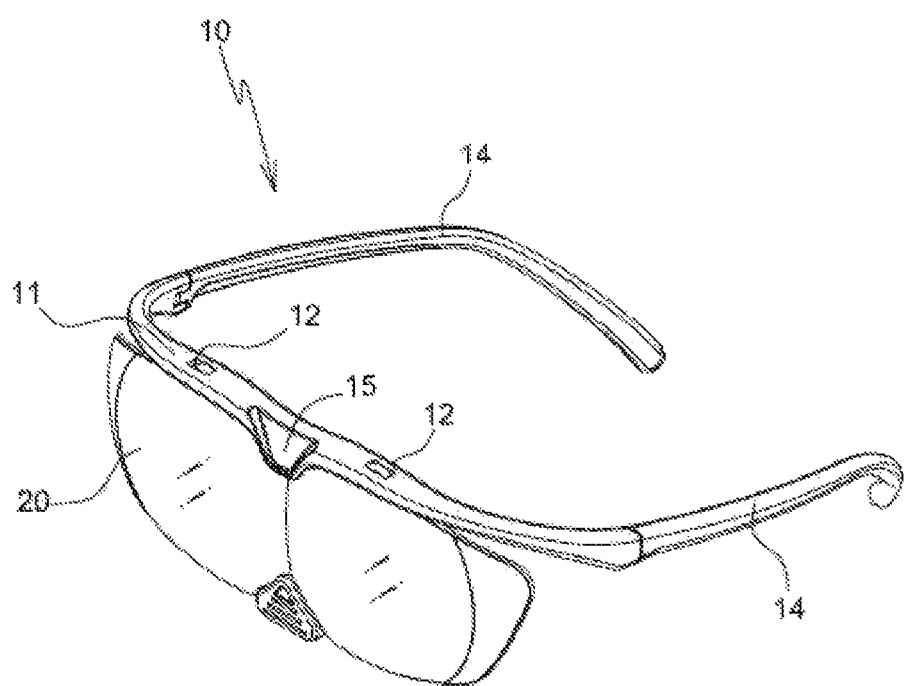
FIG. 3 is a perspective view showing the assembly of a glasses frame structure in accordance with a preferred embodiment of the present invention.
Figure 4:
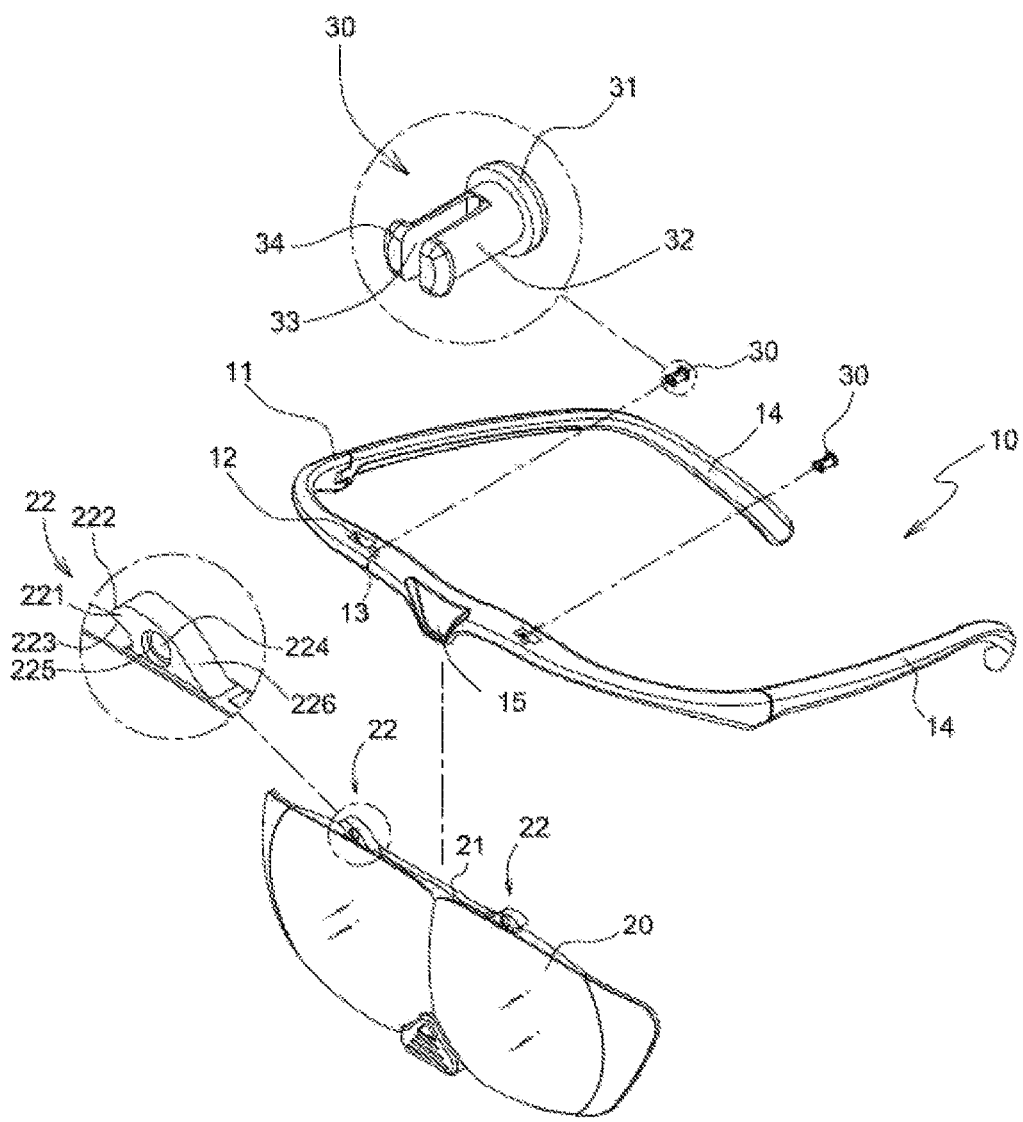
FIG. 4 is a perspective view showing the exploded components of the glasses frame structure in accordance with the preferred embodiment of the present invention.
Figure 5:
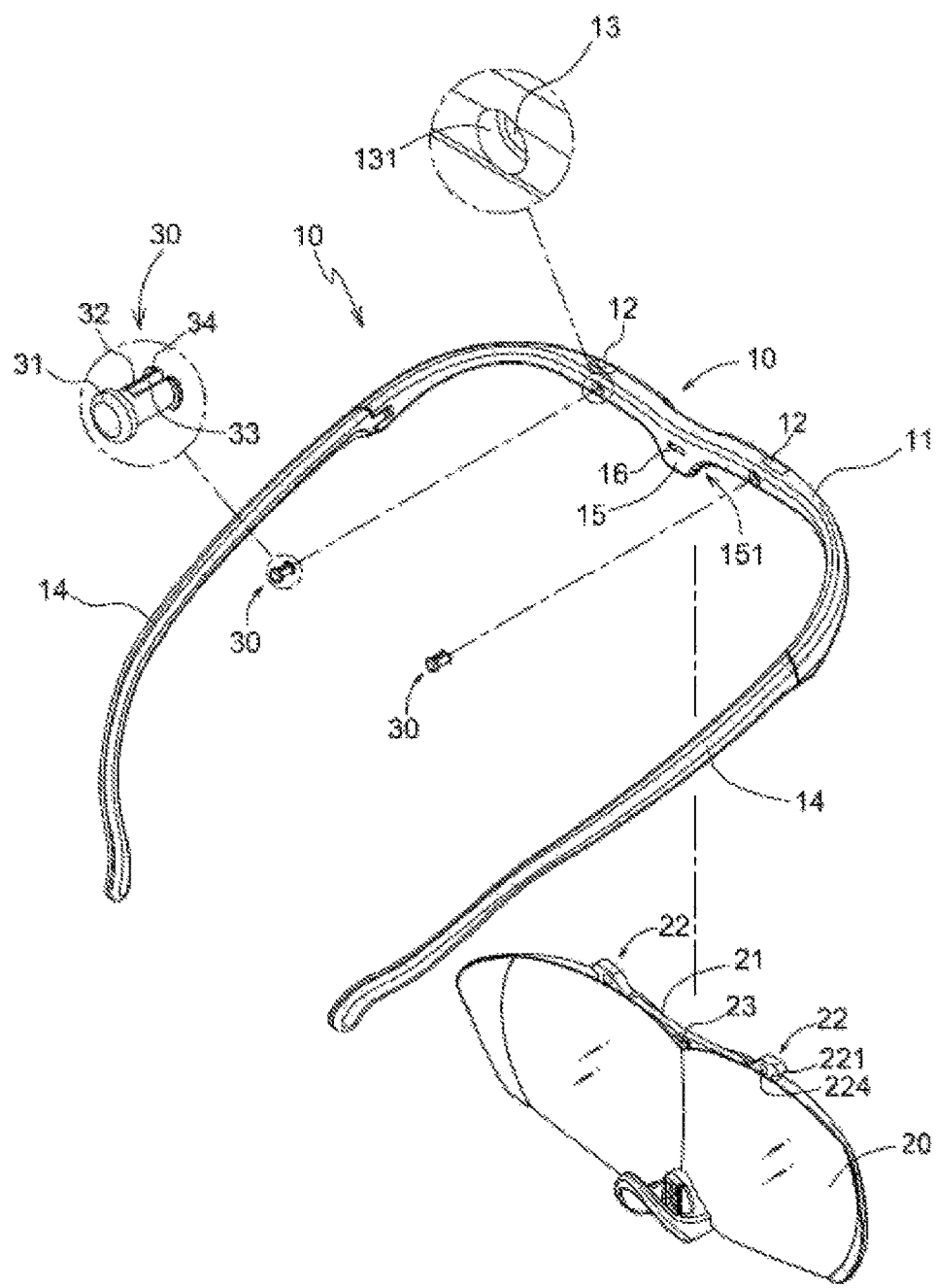
FIG. 5 is another perspective view showing the exploded components of the glasses frame structure in accordance with the preferred embodiment of the present invention.
Figure 6:
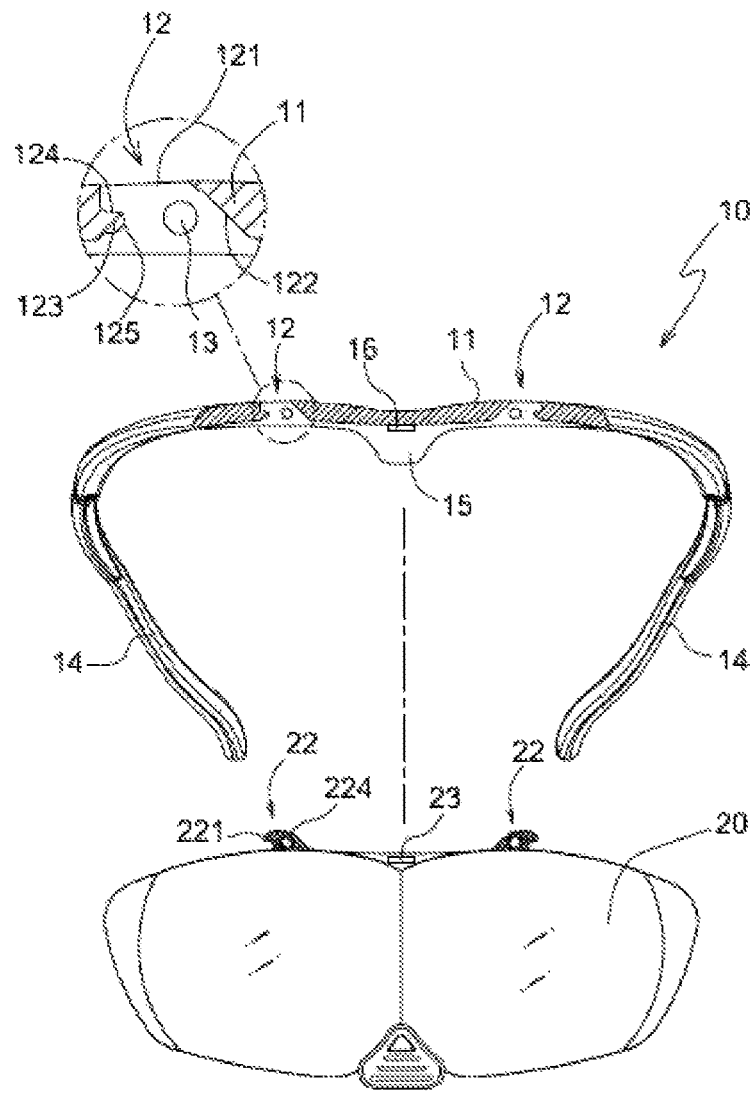
FIG. 6 is a cross sectional view showing the exploded components of the glasses frame structure in accordance with the preferred embodiment of the present invention.

Referring to the drawings and initially to FIGS. 3-12, a glasses frame structure in accordance with a preferred embodiment of the present invention comprises: a body 10, a lens assembly 20, and a fixing element 30.

The body 10 includes a fixer 11 made of elastic plastic material, two extensions 14 extending from two ends of the fixer 11 respectively, a connection protrusion 15 formed on a central position of the fixer 11, wherein the connection protrusion 15 has a limiting groove 151 defined thereon, and the limiting groove 151 has a positioning orifice 16 formed therein. The fixer 11 has two first retaining units 12 symmetrically arranged on two sides thereof respectively, and each of the two first retaining units 12 has a fastening space 121 longitudinally defined therein, wherein the fastening space 121 has a first tilted face 122 formed therein and has a first engagement tab 123 facing to the first tilted face 122. The fixer 11 is made of grilamid trogamid cx (TR90), and the first engagement tab 123 of said each first retaining unit 12 has a guiding face 125 formed on a bottom thereof and has a contacting face 124 formed on a top thereof.

Figure 7:
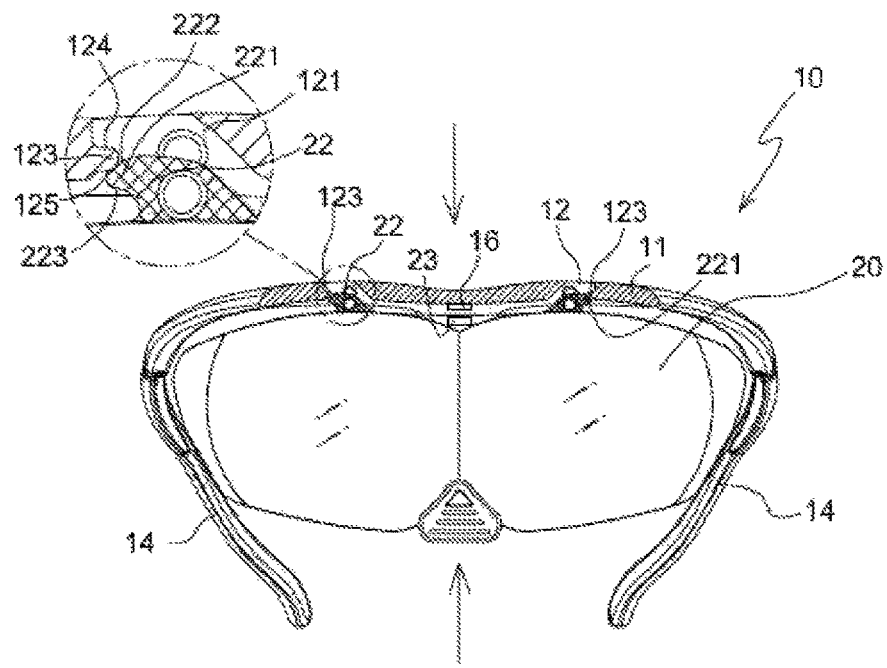
FIG. 7 is a cross sectional view showing the operation of the glasses frame structure in accordance with the preferred embodiment of the present invention.
Figure 8:
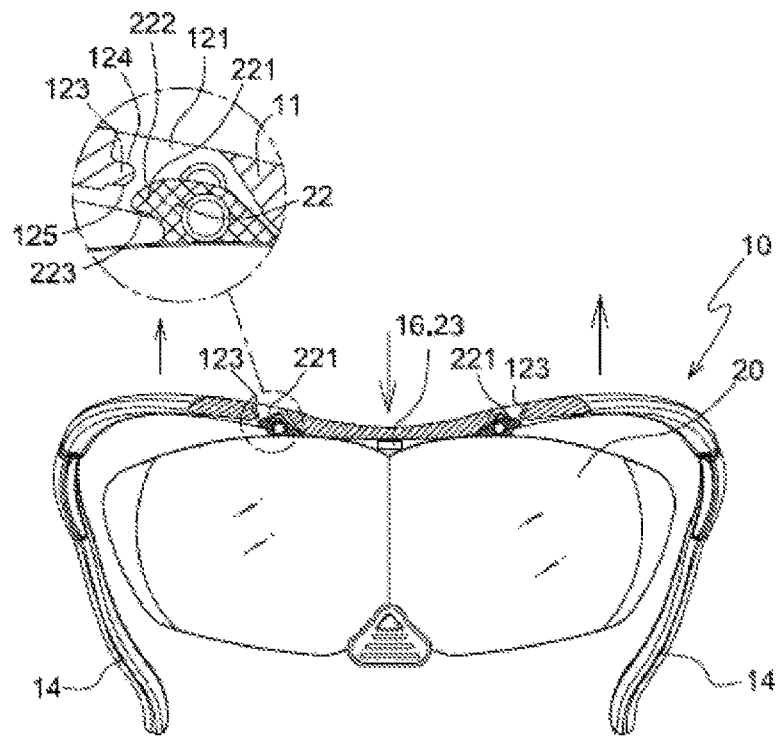
FIG. 8 is another cross sectional view showing the operation of the glasses frame structure in accordance with the preferred embodiment of the present invention.
Figure 9:
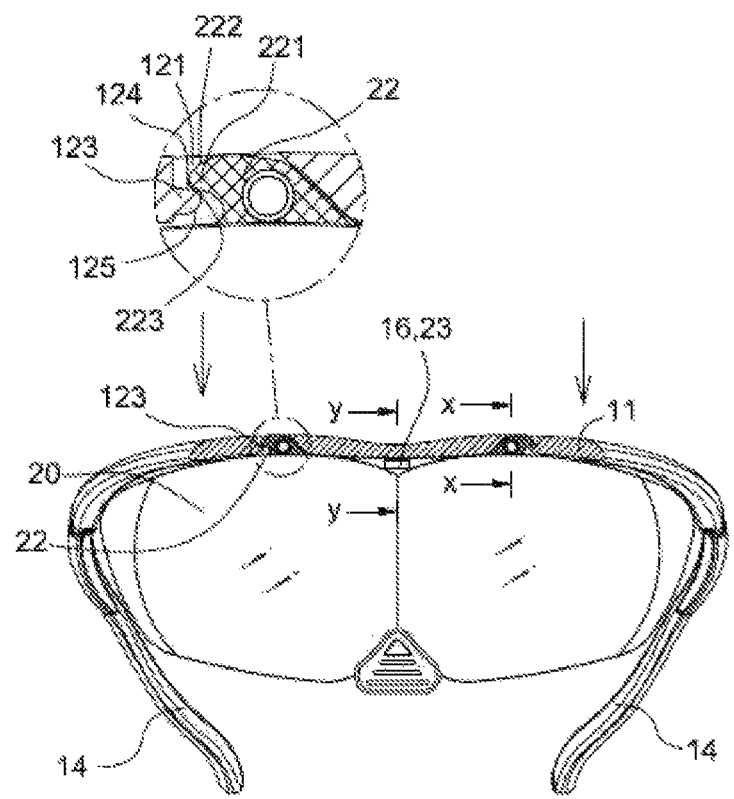
FIG. 9 is also another cross sectional view showing the operation of the glasses frame structure in accordance with the preferred embodiment of the present invention.
Figure 12:
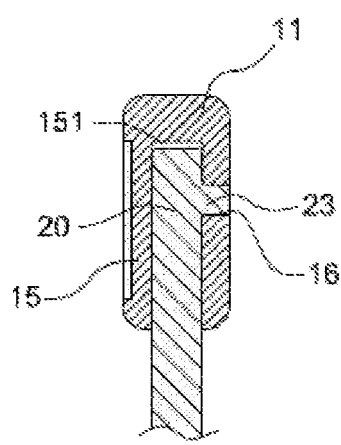
FIG. 12 is a cross sectional view taken along the line Y-Y of FIG. 9.

The lens assembly 20 includes a top fringe 21 arranged on a top thereof, an affix projection 23 formed on a central position of the top fringe 21 and corresponding to the positioning orifice 16 of the fixer 11 so that the top fringe 21 retains with the limiting groove 151 of the fixer 11, and the affix projection 23 engages with the positioning orifice 16, as shown in FIG. 12. The top fringe 21 of the lens assembly 20 has two second retaining units 22 corresponding to the two first retaining units 12 of the fixer 11 individually, wherein said each second retaining unit 22 has a second tilted face 226 defined on a first side thereof and has a second engagement tab 221 arranged on a second side of said each second retaining unit 22, wherein the second engagement tab 221 has a third face 222 formed on a top thereof and has a locking face 223 formed on a bottom of the second engagement tab 221 so that the fixer 11 expands flexibly, the fastening space 121 of said each first retaining unit 12 stretches horizontally so as to enhance locking margin of the fastening space 121 and the second engagement tab 221. The second engagement tab 221 retains in the first engagement tab 123 by using the second tilted face 226 and the first tilted face 122 so that the third face 222 of the second engagement tab 221 contacts with the guiding face 125 of the first engagement tab 123, and the locking face 223 of the second engagement tab 221 engages with the contacting face 124 of the first engagement tab 123. After the fixer 11 returns to an original position, the second engagement tab 221 of the lens assembly 20 abuts against the first engagement tab 123 of the body 10, as illustrated in FIGS. 7 to 9.

The fixer 11 of the body 10 further has a first through hole 13 corresponding to the fastening space 121 of said each first retaining unit 12, and the first through hole 13 has a first stepped notch 131 arranged on a front end thereof, said each second retaining unit 22 of the lens assembly 20 has a second through hole 224 corresponding to the first through hole 13, and the second through hole 224 has a second stepped notch 225 defined on a rear end thereof so that when the body 10 and the lens assembly 20 are connected together, the first through hole 13 and the second through hole 224 are coupled with the fixing element 30.

Figure 10:
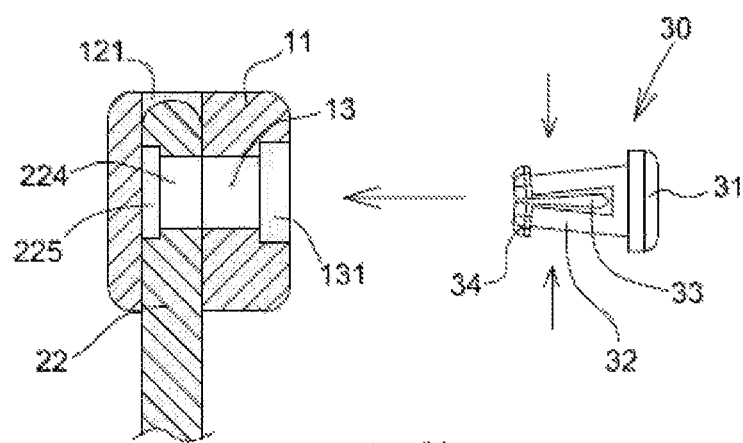
FIG. 10 is a cross sectional view taken along the line X-X of FIG. 9.
Figure 11:
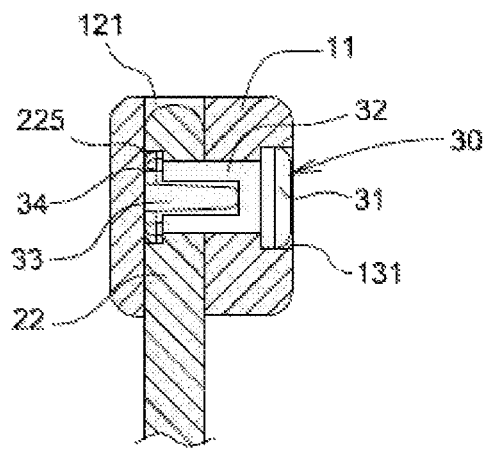
FIG. 11 is another cross sectional view taken along the line X-X of FIG. 9.

The fixing element 30 is made of grilamid trogamid cx (TR90) and includes a head disc 31, a column 32 extending outwardly from the head disc 31, a slot 33 defined in the column 32, and an extending rib 34 arranged on one end of the column 32 opposite to the head disc 31, such that the column 32 forces the slot 33 inwardly so that the extending rib 34 retracts inwardly to move into the first through hole 13 and the second through hole 224 and to retain with the second stepped notch 225 of the second through hole 224, and the head disc 31 of the fixing element 30 is limited in the first stepped notch 131 of the first through hole 13, as illustrated in FIGS. 10 and 11.

Accordingly, the fastening space 121 of said each first retaining unit 12 expends horizontally by way of the fixer 11 made of elastic plastic material so as to enhance the locking margin of the fastening space 121 and the second engagement tab 221 of the lens assembly 20. Preferably, the body 10 and the lens assembly 20 are connected firmly by means of the fastening space 121, the second engagement tab 221, and the affix projection 23.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A glasses frame structure comprising:
a body including a fixer made of elastic plastic material, two extensions extending from two ends of the fixer respectively, a connection protrusion formed on a central position of the fixer, a limiting groove defined on the connection protrusion, and a positioning orifice formed in the limiting groove; the fixer having two first retaining units symmetrically arranged on two sides of the fixer respectively, and each of the two first retaining units having a fastening space longitudinally defined in said each first retaining unit, wherein the fastening space has a first tilted face formed therein and has a first engagement tab facing to the first tilted face;
a lens assembly including a top fringe arranged on a top of the lens assembly, an affix projection formed on a central position of the top fringe and corresponding to the positioning orifice of the fixer so that the top fringe retains with the limiting groove of the fixer, and the affix projection engages with the positioning orifice; and
the top fringe of the lens assembly having two second retaining units corresponding to the two first retaining units individually, wherein said each second retaining unit has a second tilted face defined on a first side thereof and has a second engagement tab arranged on a second side of said each second retaining unit.

2. The glasses frame structure of claim 1, wherein the fixer is made of grilamid trogamid cx (TR90).

3. The glasses frame structure of claim 1, wherein the first engagement tab of said each first retaining unit has a guiding face formed on a bottom thereof and has a contacting face formed on a top thereof; the second engagement tab has a third face formed on a top thereof and has a locking face formed on a bottom of the second engagement tab.

4. The glasses frame structure of claim 1, wherein the fixer of the body further has a first through hole corresponding to the fastening space of said each first retaining unit, and the first through hole has a first stepped notch arranged on a front end thereof, said each second retaining unit of the lens assembly has a second through hole corresponding to the first through hole, and the second through hole has a second stepped notch defined on a rear end thereof so that when the body and the lens assembly are connected together, the first through hole and the second through hole are coupled with a fixing element; wherein the fixing element includes a head disc, a column extending outwardly from the head disc, a slot defined in the column, and an extending rib arranged on one end of the column opposite to the head disc.

5. The glasses frame structure of claim 4, wherein the fixing element is made of grilamid trogamid cx (TR90).

* * * * *